July 18, 1967  R. S. WILLIS  3,331,396
ORIFICE VALVE
Filed Sept. 14, 1964
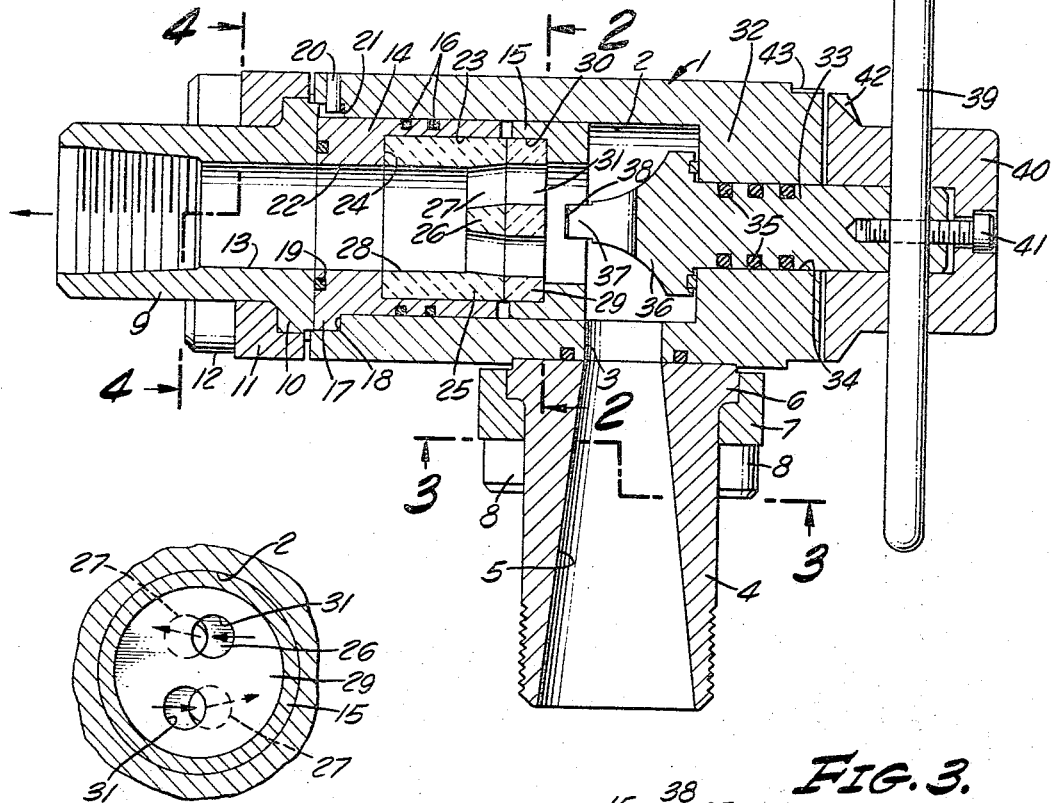
FIG. 1.
FIG. 2.
FIG. 3.
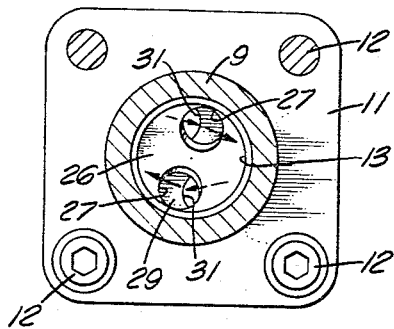
FIG. 4.
INVENTOR.
ROBERT S. WILLIS
BY Paul A. Weilein
ATTORNEY

United States Patent Office 3,331,396
Patented July 18, 1967

3,331,396
ORIFICE VALVE
Robert S. Willis, Long Beach, Calif.; N. Elizabeth Willis, executrix of said Robert S. Willis, deceased; assignor of one-half to N. Elizabeth Willis and one-half to N. Elizabeth Willis and Robert W. Willis, as trustees
Filed Sept. 14, 1964, Ser. No. 396,286
5 Claims. (Cl. 137—625.31)

The present invention relates to an orifice valve and more particularly to a multiple orifice valve usable in the control of flow of abrasive fluids such as the fluids produced from oil wells or the like.

Orifice valves are used in the control of, for example, well production fluids, to control the rate of flow through a flow line within a range determined by the number and size of a plurality of orifices in a relatively stationary orifice disk or member and a rotatable disk or member, which orifices are adapted to be brought more or less into alignment upon angular movement of the rotatable orifice disk.

As the orifice disks are moved angularly to shut off the flow through the orifices to a comparatively small volume, it has been found that resultant high fluid velocities cause erosion within the assembly, either within the orifice members or downstream of the downstream orifice member. Such erosion in part may be avoided by the use of erosion resistant materials such as ceramic materials or other hard metallic material such as tungsten carbide.

The present invention involves the recognition of the problem of erosion caused by not only high velocity streams of erosive fluid, but also the problem caused by the angular direction of the high velocity flow through the partially closed orifices which causes a high velocity stream to impinge the downstream surfaces at what may be termed an erosive angle.

Accordingly, an object of the invention is to provide an orifice type valve having orifice members, the downstream one of which is so constructed as to eliminate the effect of high velocity angular flow of the fluid stream as it leaves the partially closed orifices.

Another object of the invention is to provide an orifice member which at the downstream side of its orifices is provided with a large diameter flow passage whereby to reduce the fluid velocity within the orifice member, the latter being composed of erosion resistant material, thereby to minimize the erosive effects of the fluid flow on the supporting strucure which carries the orifice member.

Other objects and advantages of the invention will be hereinafter described or will become apparent to those skilled in the art, and the novel features of the invention will be defined in the appended claims.

In the accompanying drawing:

FIG. 1 is a longitudinal sectional view through an orifice valve made in accordance with the invention;

FIG. 2 is a transverse sectional view as taken on the line 2—2 of FIG. 1;

FIG. 3 is a horizontal sectional view as taken on the line 3—3 of FIG. 1; and

FIG. 4 is a transverse sectional view as taken on the line 4—4 of FIG. 1.

Like reference characters in the several views of the drawing and in the following description designate corresponding parts.

The illustrative assembly embodying the present invention includes an elongated valve body 1 which is provided with an elongate bore 2 leading from one end thereof. Adjacent the inner end of the bore 2 the body is provided with a port 3 leading laterally into the bore, and suitable means are provided for establishing communication between the port 3 and an inlet conduit, such means comprising a connector 4 having a flow passage 5 therethrough and secured in abutting relation with the body 1 by an end flange 6 which is held in place by a retainer plate 7 disposed about the connector 4 in engagement with the flange 6 and fastened to the body 1 as by means of cap screws 8.

Secured in the outlet end of the bore 2 is an outlet connector 9 having an end flange 10 engaged by a retainer plate 11 which is disposed about the connector 9 and fastened to the end of the body 1 by means of cap screws 12, the connector 9 having an outlet flow passage 13 therethrough.

Disposed within the bore 2 are cooperative orifice disk carriers comprising a non-rotating orifice disk carrier 14 and a rotatable orifice disk carrier 15. The non-rotatable disk carrier 14 is generally of cylindrical form so as to closely fit within the bore 2, there being suitable sealing rings 16 for effecting a seal between the body 1 and the disk carrier 14. At its outer end the disk carrier 14 is provided with an end flange 17 adapted for abutting engagement with a shoulder 18 formed in the end of the body 1, so that the end wall of the connector 9 and more particularly the flange 10 thereon will engage the outer end of the disk carrier 14 to hold it in engagement with the shoulder 18.

Preferably, a seal ring 19 is interposed between the connector 9 and the adjacent end of the disk carrier 14. If desired, means may be provided for positively preventing rotation of the disk carrier 14 which will act in addition to the friction which would normally hold the disk carrier 14 against rotation, and such additional means in the illustrative embodiment comprises a pin 20 extended through the side wall of the body 1 for engagement in a peripheral notch 21 in the disk carrier flange 17.

The disk carrier 14 is provided with a bore or outlet flow opening 22 which is, as shown, preferably approximately the same diameter or flow area as the outlet passage 13 in the connector 9. In addition, the disk carrier 14 is provided with an enlarged bore 23 and an intermediate shoulder 24 forming a seat for an orifice disk 25.

This orifice disk 25 is preferably composed of ersion resistant material such as ceramic material or certain erosion resistant metallic material such as tungsten carbide. The orifice disk 25 has a transversely extended wall 26 having a plurality of convergent flow passages or orifices 27 therethrough which lead angularly downstream toward the center of and into a bore or chamber 28 within the disk 25. Chamber 28 is at least as large in diameter as the diametrical distance between the outer extremities of the orifices 27 at their outlet ends. With particular reference to FIG. 1, it will be observed that the downstream orifice disk 25 is shown as having certain proportions which have been found to be especially well suited in the use of the invention. The orifices 27 in the wall 26 have a length to diameter ratio of about 1:1, and the chamber 28 not only extends outwardly beyond the outer extreme of the orifices 27, but has a length of about twice the length of the orifices 27, i.e., the orifice 27 to chamber 28 length ratio is about 1:2.

A cooperative rotatable orifice disk 29 is carried by the rotatable disk carrier 15 in contiguous relation or confronting disk 25, the disk carrier 15 being provided with a seat 30 for reception of the orifice disk 29. The disk 29 has a plurality of orifices 31 therethrough which are adapted to be brought more or less into registry with the orifices 27 in the disk 25 upon angular movement of the rotary disk carrier 15.

To effect such angular movement, an operator member is rotatably mounted in the end wall 32 of the body 1. This operator member includes a stem 33 extended through an opening 34 in the end wall 32 and sealed therein as by means of O-rings 35. At its inner end the stem 33 carries a forked turning member 36 having tines 37 (seen best in broken lines in FIG. 3) engageable in notches 38 formed in the rotary disk carrier 15. The forked turning member 36 is adapted to be rotated by an operating handle or wheel 39 formed as part of a cap 40 secured by a fastener 41 to the outer extremity of the stem 33. Preferably, the cap has means such as a notch 42 adapted to be brought into alignment with a suitable number of graduating markers or ribs 43 on the adjacent end of the body 1, as indicative of a selected angular position of the rotary disk carrier 15 relative to the non-rotating disk carrier 14 and thus indicative of the condition of the valve, that is, weather the valve is full closed, full opened, or at some intermediate position.

It will now be apparent that fluid flowing through the valve assembly will enter the bore 2 through the inlet passage 5 and inlet port 3 and will flow through the rotary orifice disk carrier 15 and thence through the orifices 31 in the orifice disk 29 when the orifices 31 are at least in part in registry with the orifices 27 in the orifice disk 25. The angular convergence of the orifice disk ports 27 tends to direct the flow centrally of the outlet flow passgae from the valve body, particularly when the orifices 31 and 27 are in full registry.

However, as shown in FIGS. 2 and 4, when the orifices as illustrated are only in partial registry, the resultant effect on fluid flowing into an orifice 31 and out of an orifice 27 through the substantially elliptical pinched off passageway therebetween is that fluid is caused to flow angularly, as shown by the arrows in FIGS. 2 and 4. In the present construction, the flow path through the orifices 27 is comparatively short, and velocity of the flow rapidly decreases upon entry of the stream into enlarged chamber 28 within the erosion resistant disk 25, and the velocity is much lower at the point at which fluid flows into the passage 22 in the disk carrier 14 and into the outlet passage 13. Moreover, since the chamber is at least equal in diameter to the distance across the outer extremes of the orifices at the outlet ends of the orifices 27 and has a length approximately twice the length of one of the orifices, high velocity flow is reduced within the chamber and the high velocity fluid erosion effect is eliminated entirely within the orifice disk 25.

While the specific details of the invention have been herein shown and described, changes and alterations may be resorted to without departing from the spirit of the invention as defined in the appended claims.

I claim:

1. An orifice valve assembly, comprising: an elongated body having a bore; inlet means leading into said bore; outlet means leading from said bore; a pair of relatively rotatable disk carriers spanning said bore between said inlet and outlet means; each of said carriers having a passage extending therethrough; means for rotating one of said disk carriers relative to the other; a disk carried by each disk carrier with said disks in contiguous relation; the upstream disk having at least one orifice opening into the passage through its disk carrier; the downstream disk having at least one orifice communicable with the orifice in said upstream disk upon relative rotation of said disk carriers; and an enlarged chamber in said downstream disk leading between said downstream disk orifice and said outlet means; said chamber having a length greater than the axial extent of said downstream orifice and having a crosswise extent at least equal to said length.

2. An orifice valve assembly as defined in claim 1, wherein said orifice in said downstream disk extends angularly downstream toward the center of said chamber.

3. An orifice valve assembly, comprising: an elongated body having a bore; inlet means leading into said bore; outlet means leading from said bore; a pair of relatively rotatable disk carriers spanning said bore between said inlet and outlet means; each of said carriers having a passage extending therethrough; means for rotating one of said disk carriers relative to the other; a disk carried by each disk carrier with said disks in contiguous relation; the upstream disk having at least one orifice opening into the passage through its disk carrier; the downstream disk having at least one orifice communicable with the orifice in said upstream disk upon relative rotation of said disk carriers; and an enlarged chamber in said downstream disk leading between said downstream disk orifice and said outlet means; said downstream disk being composed of an erosion resistant material; said chamber having a length greater than the axial extent of said downstream orifice and having a crosswise extent at least equal to said length.

4. An orifice valve assembly, comprising: an elongated body having a bore; inlet means leading into said bore; outlet means leading from said bore; a pair of relatively rotatable disk carriers spanning said bore between said inlet and outlet means; each of said carriers having a passage extending therethrough; means for rotating one of said disk carriers relative to the other; a disk carried by each disk carrier with said disks in contiguous relation; the upstream disk having at least one orifice opening into the passage through its disk carrier; the downstream disk having at least one orifice communicable with the orifice in said upstream disk upon relative rotation of said disk carriers; and an enlarged chamber in said downstream disk leading between said downstream disk orifice and said outlet means; said downstream disk orifice having a length to diameter ratio of 1:1; said chamber being elongate and having a diameter at least equal to the length thereof.

5. An orifice valve assembly, comprising: an elongated body having a bore; inlet means leading into said bore; outlet means leading from said bore; a pair of relatively rotatable disk carriers spanning said bore between said inlet and outlet means; each of said carriers having a passage extending therethrough; means for rotating one of said disk carriers relative to the other; a disk carried by each disk carrier with said disks in contiguous relation; the upstream disk having at least one orifice opening into the passage through its disk carrier; the downstream disk having at least one orifice communicable with the orifice in said upstream disk upon relative rotation of said disk carriers; and an enlarged chamber in said downstream disk leading between said downstream disk orifice and said outlet means; said carriers being tubular and provided with enlarged bores in which said disks are seated; the carrier for the downstream disk being of greater length than the carrier for the upstream disk and having a portion extending downstream from said downstream disk; said downstream disk having an elongate tubular portion forming said chamber and wherein the diameter of the chamber is at least equal to the length thereof.

References Cited

UNITED STATES PATENTS

| 592,187 | 10/1897 | Berr | 137—625.31 |
| 1,014,766 | 1/1912 | Lytton | 137—625.31 |
| 1,223,353 | 4/1917 | Angell | 251—361 X |
| 1,233,262 | 7/1917 | Vaeth | 137—625.31 X |
| 2,935,293 | 5/1960 | Monson | 137—625.31 X |

FOREIGN PATENTS 48,586 6/1919 Sweden.

M. CARY NELSON, *Primary Examiner.*

A. ROSENTHAL, *Assistant Examiner.*